(12) United States Patent
Yamamori et al.

(10) Patent No.: US 11,450,867 B2
(45) Date of Patent: Sep. 20, 2022

(54) FUEL CELL SYSTEM

(71) Applicant: TOYOTA JIDOSHA KABUSHIKI KAISHA, Toyota (JP)

(72) Inventors: Keitaro Yamamori, Okazaki (JP); Tomoya Ogawa, Okazaki (JP); Hiroaki Mori, Ogaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 16/726,352

(22) Filed: Dec. 24, 2019

(65) Prior Publication Data

US 2020/0243878 A1 Jul. 30, 2020

(30) Foreign Application Priority Data

Jan. 28, 2019 (JP) .............................. JP2019-012360

(51) Int. Cl.
| | |
|---|---|
| *H01M 8/04089* | (2016.01) |
| *H01M 8/0444* | (2016.01) |
| *H01M 8/04537* | (2016.01) |
| *H01M 8/04955* | (2016.01) |
| *H01M 8/0438* | (2016.01) |
| *H01M 8/0432* | (2016.01) |

(52) U.S. Cl.
CPC ... *H01M 8/04089* (2013.01); *H01M 8/04328* (2013.01); *H01M 8/04388* (2013.01); *H01M 8/04447* (2013.01); *H01M 8/04559* (2013.01); *H01M 8/04589* (2013.01); *H01M 8/04955* (2013.01)

(58) Field of Classification Search
CPC ........... H01M 8/04089; H01M 8/4328; H01M 8/4388; H01M 8/04447; H01M 8/04559; H01M 8/04589; H01M 8/04955
See application file for complete search history.

(56) References Cited

U.S. PATENT DOCUMENTS

| | | | | |
|---|---|---|---|---|
| 9,190,683 | B2 * | 11/2015 | Takaichi | ............. H01M 8/2483 |
| 9,711,812 | B2 * | 7/2017 | Katano | ............. H01M 8/04201 |
| 10,249,890 | B2 * | 4/2019 | Procter | ............. H01M 8/04492 |

(Continued)

FOREIGN PATENT DOCUMENTS

| | | |
|---|---|---|
| JP | 2006-294304 A | 10/2006 |
| JP | 2008-010197 A | 1/2008 |

(Continued)

*Primary Examiner* — Amanda C. Walke
(74) *Attorney, Agent, or Firm* — Dickinson Wright, PLLC (57) ABSTRACT

A fuel cell system includes a fuel cell including a fuel electrode being supplied with fuel gas and an oxidant electrode being supplied with oxidant gas and generating electric power by causing the fuel gas and the oxidant gas to react with each other, a voltmeter measuring an output voltage of the fuel cell, an ammeter measuring an output current of the fuel cell, a restricting valve provided upstream and downstream of an oxidant electrode side of the fuel cell and being opened in a power generation state and being closed in a stopped state or under the oxygen consuming control, and a load control unit controlling a current value of an output current to be output by the fuel cell and, under the oxygen consuming control, controlling the output voltage of the fuel cell such that the output current reduces as the output voltage of the fuel cell increases.

9 Claims, 5 Drawing Sheets (56) References Cited

U.S. PATENT DOCUMENTS

| | | | |
|---|---|---|---|
| 2011/0159390 A1 | 6/2011 | Kumada et al. | |
| 2017/0346117 A1 | 11/2017 | Ojima et al. | |
| 2018/0366753 A1* | 12/2018 | Okuyoshi | H01M 8/0438 |
| 2020/0144637 A1* | 5/2020 | Wagner | H01M 8/04291 |
| 2021/0226235 A1* | 7/2021 | Namba | H01M 8/04805 |

FOREIGN PATENT DOCUMENTS

| | | |
|---|---|---|
| JP | 2010-086939 A | 4/2010 |
| JP | 2013-145709 A | 7/2013 |
| JP | 2017143041 A | 8/2017 |
| JP | 2017-216060 A | 12/2017 |

\* cited by examiner

SCHEMATIC VIEW THAT ILLUSTRATES FILLED OXYGEN
AT START OF OXYGEN CONSUMING PROCESS

OXYGEN CONSUMPTION PROCEEDS

SCHEMATIC VIEW THAT ILLUSTRATES FILLED OXYGEN
AFTER PROGRESS OF OXYGEN CONSUMING PROCESS

FIG. 5

SCHEMATIC VIEW THAT ILLUSTRATES FILLED OXYGEN IN COURSE OF OXYGEN CONSUMING PROCESS WHEN OUTPUT CURRENT IS REDUCED WITH DECREASE IN OUTPUT VOLTAGE (COMPARATIVE EXAMPLE)

FIG. 6

SCHEMATIC VIEW THAT ILLUSTRATES FILLED OXYGEN AFTER PROGRESS OF OXYGEN CONSUMING PROCESS WHEN OUTPUT CURRENT IS INCREASED WITH DECREASE IN OUTPUT VOLTAGE (FIRST EMBODIMENT)

FIG. 7

FUEL CELL SYSTEM

INCORPORATION BY REFERENCE

The disclosure of Japanese Patent Application No. 2019-012360 filed on Jan. 28, 2019 including the specification, drawings and abstract is incorporated herein by reference in its entirety.

BACKGROUND

1. Technical Field

The disclosure relates to a fuel cell system that performs an oxygen consuming process in which oxygen remaining in cells of a fuel cell is consumed when the fuel cell system stops its operation.

2. Description of Related Art

In a vehicle on which a fuel cell is mounted, a drive motor is driven by using electric power generated by the fuel cell. The fuel cell stops supply of oxidant to the fuel cell when the fuel cell stops power generation, for example, when a vehicle is parked. At this time, an oxygen consuming process is performed. In the oxygen consuming process, an output voltage of the fuel cell is decreased to a predetermined voltage or below by consuming oxygen in cells of the fuel cell to curb the deterioration of the cells of the fuel cell. An example of a technique related to the oxygen consuming process is described in Japanese Unexamined Patent Application Publication No. 2008-010197 (JP 2008-010197 A).

A fuel cell system described in JP 2008-010197 A includes a fuel cell stack, a restricting valve, a load acquisition unit, and a control unit. The fuel cell stack includes a fuel electrode that receives supply of fuel gas and an oxidant electrode that receives supply of oxidant gas and generates electric power. The fuel cell stack generates electric power by causing fuel gas and oxidant gas to react with each other. The restricting valve is provided upstream and downstream of the oxidant electrode of the fuel cell stack, and restricts flow of outside air into the oxidant electrode when the restricting valve is closed. The load acquisition unit controls a current value when current is taken out from the fuel cell stack or a voltage value when current is taken out from the fuel cell stack. The control unit controls the restricting valve to open or close and the load acquisition unit to take out current. The control unit closes the restricting valve and takes out current with the load acquisition unit when the system stops and takes out current with the load acquisition unit during a system stop period until the system is restarted.

SUMMARY

However, in the fuel cell system described in JP 2008-010197 A, oxidant gas in the fuel cell stack is consumed in a state where the restricting valve is closed. This causes a pumping phenomenon that the concentration of oxidant gas at the oxidant electrode side excessively decreases and fuel gas is generated at the oxidant electrode side to compensate for the excessively reduced oxidant gas. The pumping phenomenon leads to inconvenience that the concentration of fuel gas that leaks to an exhaust side increases at the time of restart.

The disclosure reduces leakage of fuel gas to an exhaust side when a fuel cell undergoes an oxygen consuming process.

An aspect of the disclosure provides a fuel cell system that executes oxygen consuming control for consuming oxygen remaining in a fuel cell when the fuel cell is shifted from a power generation state to a stopped state. The fuel cell system includes the fuel cell, a voltmeter, an ammeter, a restricting valve, and a load control unit. The fuel cell includes a fuel electrode configured to be supplied with fuel gas and an oxidant electrode configured to be supplied with oxidant gas. The fuel cell is configured to generate electric power by causing the fuel gas and the oxidant gas to react with each other. The voltmeter is configured to measure an output voltage of the fuel cell. The ammeter is configured to measure an output current of the fuel cell. The restricting valve is provided upstream and downstream of an oxidant electrode side of the fuel cell. The restricting valve is configured to be opened in a power generation state and be closed in a stopped state or under the oxygen consuming control. The load control unit is configured to control a current value of an output current to be output by the fuel cell. The load control unit is configured to, under the oxygen consuming control, control the output voltage of the fuel cell such that the output current reduces as the output voltage of the fuel cell increases.

With the fuel cell system according to the disclosure, in an oxygen consuming process of the fuel cell, the output current is reduced as the output voltage of the fuel cell increases. Therefore, the fuel cell system reduces leakage of fuel gas to the oxidant electrode side by restraining the pumping phenomenon that occurs in the fuel cell.

According to the disclosure, when the oxygen consuming process of the fuel cell is performed, leakage of fuel gas to an exhaust side of the fuel cell is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

For clear illustration, the following description and drawings are omitted or simplified as needed. Elements shown in the drawings as functional blocks that execute various processes may be made up of a central processing unit (CPU), a memory, and other circuits in hardware aspect and may be implemented by a program or other information loaded on the memory in software aspect. Therefore, persons skilled in the art understand that these functional blocks can be implemented in various forms by hardware only, software only, or a combination of hardware and software, and the functional blocks are not limited to any one of them. In the drawings, like reference numerals denote like elements, and the description will not be repeated where appropriate.

The above program can be stored in various types of non-transitory computer readable media and can be supplied to a computer. The non-transitory computer readable medium includes various types of tangible storage media. Examples of the non-transitory computer readable media include a magnetic recording medium (such as a flexible disk, a magnetic tape, and a hard disk drive), a magnetooptical recording medium (such as a magneto-optical disk), a CD-ROM (read only memory), a CD-R, CD-R/W, a semiconductor memory (such as a mask ROM, a PROM (programmable ROM), an EPROM (erasable PROM), a flash ROM, and a RAM (random access memory)). The program may be supplied to a computer via various types of transitory computer readable media. Examples of the transitory computer readable media include an electric signal, an optical signal, and an electromagnetic wave. A transitory computer readable medium is able to supply the program to a computer via a wired communication path, such as an electric wire and an optical fiber, or a wireless communication path.

First Embodiment

Figure 1:
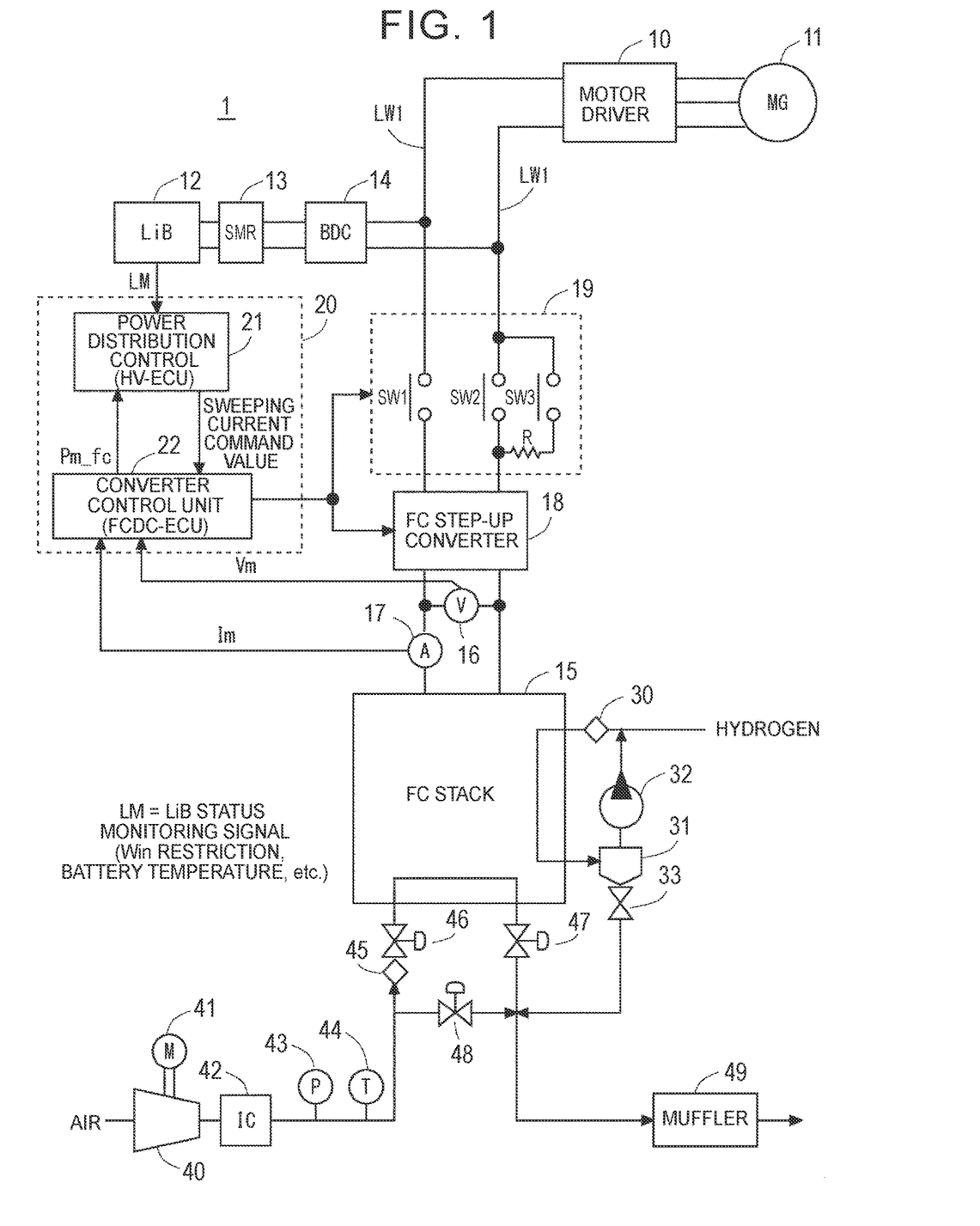
FIG. 1 is a block diagram of a fuel cell system according to a first embodiment.

FIG. 1 is a block diagram of a fuel cell system 1 according to a first embodiment. FIG. 1 is a block diagram of the fuel cell system that is an example of a vehicle including a fuel cell. As shown in FIG. 1, the fuel cell system 1 according to the first embodiment includes the fuel cell (for example, a fuel cell stack 15) and a secondary battery (for example, a lithium ion battery 12) as power supplies. A motor 11 is driven by using the fuel cell and the secondary battery. In the fuel cell system 1 according to the first embodiment, the fuel cell, the secondary battery, and the motor 11 input or output electric power from or to one another through load wires LW1, LW2.

As shown in FIG. 1, the fuel cell system 1 according to the first embodiment includes a motor driver 10, the motor 11, the lithium ion battery 12, a system main relay switch 13, a battery-side step-up converter 14, the fuel cell stack 15, a voltmeter 16, an ammeter 17, a fuel cell-side step-up converter 18, a relay switch 19, and a load control unit 20. The fuel cell system 1 according to the first embodiment also includes auxiliaries that control supply of fuel gas to the fuel cell stack 15 and auxiliaries that control supply of oxidant gas to the fuel cell stack 15. Examples of the auxiliaries that control supply of fuel gas include a shut-off valve 30, a separator 31, a hydrogen pump 32, and a drain valve 33. Examples of the auxiliaries that control supply of oxidant gas include an air compressor 40, a compressor motor 41, an intercooler 42, a barometric pressure sensor 43, a temperature sensor 44, a restricting valve (such as the shut-off valve 45, an inlet-side pressure regulating valve 46, an outlet-side pressure regulating valve 47), a bypass passage pressure regulating valve 48, and a muffler 49.

The motor driver 10 drives the motor 11 based on an electric power that is supplied via the load wires LW1, LW2. The lithium ion battery 12 is a chargeable and dischargeable secondary battery. The lithium ion battery 12 includes a battery monitoring circuit that monitors the status of a battery cell that stores energy. The battery monitoring circuit outputs battery monitoring information LM containing information such as an allowable input power Win and a battery temperature. The system main relay switch 13 is a switch that interrupts input and output of electric power to the lithium ion battery 12 or switches between input and output. The battery-side step-up converter 14 steps up the output voltage of the lithium ion battery 12 and outputs the stepped-up output voltage to the load wires LW1, LW2. The battery-side step-up converter 14 steps down the voltage of electric power that is supplied from the load wires LW1, LW2 and transfers the electric power to the lithium ion battery 12. The on/off state of the system main relay switch 13 is controlled by a battery control circuit (not shown).

The fuel cell stack 15 generates electric power by causing fuel gas and oxidant gas to react with each other. Electric power generated by the fuel cell stack 15 is stepped up by the fuel cell-side step-up converter 18 and is output to the load wires LW1, LW2 via the relay switch 19. The on/off state of the relay switch 19 is controlled by a fuel cell control circuit (not shown). The voltmeter 16 monitors the output voltage of the fuel cell stack 15 and outputs an FC output voltage Vm. The ammeter 17 monitors the output current of the fuel cell stack 15 and outputs an FC output current Im.

The relay switch 19 includes switches SW1, SW2, SW3, and a resistance R. The switch SW1 switches whether to output the power of the fuel cell-side step-up converter 18 to the load wire LW1. The switch SW2 switches whether to output the power of the fuel cell-side step-up converter 18 to the load wire LW2. The switch SW3 is connected in parallel with the switch SW2 so as to bypass the switch SW2. The resistance R is connected between the fuel cell-side step-up converter 18-side terminal of the switch SW2 and the fuel cell-side step-up converter 18-side terminal of the switch SW3.

The load control unit 20 controls the value of current that the fuel cell stack 15 outputs. Specifically, the load control unit 20 controls the output current of the fuel cell stack 15 in an oxygen consuming process (described later). The load control unit 20 controls the magnitude of the FC output current Im that is output from the fuel cell stack 15 during the oxygen consuming process based on the allowable input power Win, FC output voltage Vm, and FC output current contained in the battery monitoring information LM output from the lithium ion battery 12. During the oxygen consuming process, the load control unit 20 controls the FC output current Im of the fuel cell stack 15 such that the FC output current Im reduces as the FC output voltage Vm of the fuel cell stack 15 increases. The details of a current control method in the load control unit 20 will be described later.

The load control unit 20 includes a power distribution control unit 21 and a converter control unit 22. The power distribution control unit 21 calculates a sweeping current command value ifc_cm based on the mathematical expression (1) by using the battery monitoring information LM, an FC output power Pm_fc that is generated by the converter control unit 22, and the FC output voltage Vm. In the mathematical expression (1), Itgt is a value of current that is the reference of the FC output current Im of the fuel cell stack 15 during the oxygen consuming process, and Pm_alw is an allowable input power that is contained in the battery monitoring information LM.

$$ifc\_cm = Itgt + (Pm\_alw - Pm\_fc)/Vm \qquad (1)$$

The converter control unit 22 controls the fuel cell-side step-up converter 18 and the relay switch 19 based on the FC output voltage Vm, the FC output current Im, and the sweeping current command value, and causes the fuel cell-side step-up converter 18 to output an electric power having a preset voltage value and the amount of current having a current value corresponding to the sweeping current command value.

The shut-off valve 30 is provided in a path through which hydrogen flows into the fuel cell stack 15 among pipes through which hydrogen that is fuel gas flows. The open/closed state of the shut-off valve 30 is controlled by a control unit (not shown). The shut-off valve 30 is placed in the open state during operation and is placed in a closed state after completion of the oxygen consuming process. The separator 31 is provided in an exhaust passage of the fuel cell stack 15. The separator 31 separates water and hydrogen gas from each other. The hydrogen pump 32 returns hydrogen gas, separated in the separator 31, to a pipe upstream of the shut-off valve 30. The drain valve 33 drains water, separated in the separator 31, to a pipe connected to the muffler 49.

The air compressor 40 adjusts outside air to a predetermined pressure and takes the outside air into the fuel cell stack 15. The compressor motor 41 is a motor for actuating the air compressor 40. The intercooler 42 cools the temperature of outside air compressed by the air compressor 40. The barometric pressure sensor 43 is a sensor that monitors the barometric pressure of outside air to be supplied to the fuel cell stack 15. The temperature sensor 44 is a sensor that monitors the temperature of outside air to be supplied to the fuel cell stack 15. The air compressor 40 adjusts the pressure of outside air to be supplied to the fuel cell stack 15 based on the barometric pressure monitored by the barometric pressure sensor 43. The intercooler 42 adjusts the temperature of outside air to be supplied to the fuel cell stack 15 based on the temperature monitored by the temperature sensor 44.

In the fuel cell system 1 according to the first embodiment, the shut-off valve 45, the inlet-side pressure regulating valve 46, and the outlet-side pressure regulating valve 47 make up the restricting valve that is provided upstream and downstream of the fuel cell stack 15 and that is opened in a power generation state and closed in a stopped state or under oxygen consuming control. The shut-off valve 45 is provided in a passage through which outside air flows into the fuel cell stack 15. The shut-off valve 45 is controlled to an open state in a period during which the fuel cell stack 15 generates electric power and is controlled to a closed state in a period during which the fuel cell stack 15 undergoes oxygen consuming process or is placed in a power generation stopped state. The inlet-side pressure regulating valve 46 is a valve that is provided at an inlet of the fuel cell stack 15 for outside air and that adjusts the barometric pressure of outside air in the fuel cell stack 15. The outlet-side pressure regulating valve 47 is a value that is provided at an outlet of the fuel cell stack 15 for gas and that adjusts the barometric pressure in the fuel cell stack 15. The bypass passage pressure regulating valve 48 is a valve that is provided between a pipe upstream of the shut-off valve 45 and a pipe downstream of the outlet-side pressure regulating valve 47 and that adjusts a pressure difference between the two pipes. The muffler 49 is provided in an exhaust passage of the fuel cell stack 15. The muffler 49 controls gas to be emitted.

The shut-off valve 45, the inlet-side pressure regulating valve 46, the outlet-side pressure regulating valve 47, and the bypass passage pressure regulating valve 48 each are controlled by a control unit (not shown). The pressure regulating valves each have a structure in which gas flows only in one direction. Each pressure regulating valve decreases the amount of emission at the outlet side to a set pressure when the pressure at the inlet side exceeds a set pressure, and decreases the pressure at the exhaust side with a decrease in the pressure at the inlet side when the pressure at the inlet side is lower than or equal to the set pressure.

Figure 2:
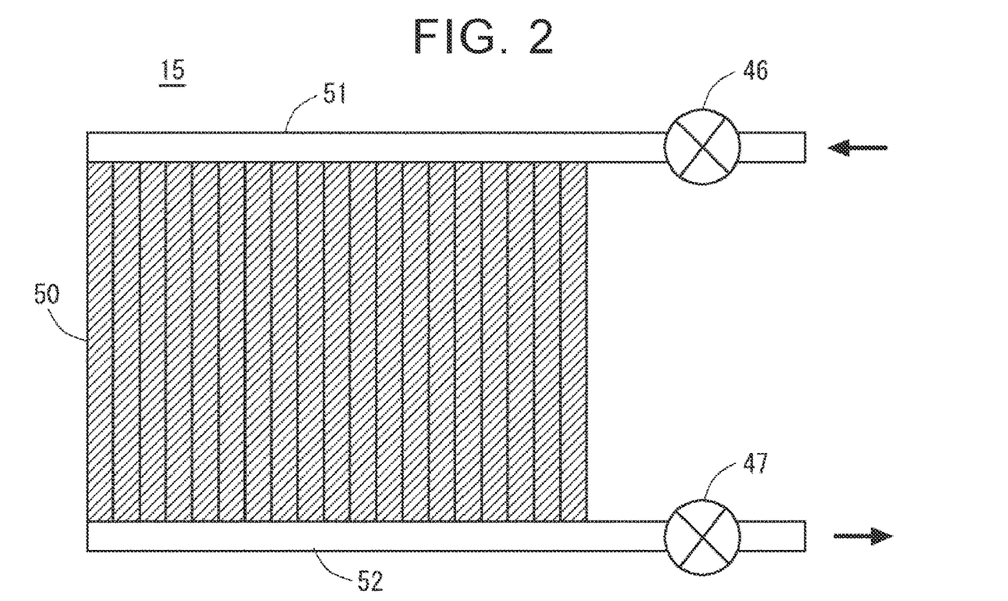
FIG. 2 is a view that illustrates a fuel cell stack according to the first embodiment.

Next, the structure of the fuel cell stack 15 that is subjected to the oxygen consuming process in the fuel cell system 1 according to the first embodiment will be described. FIG. 2 is a view that shows the fuel cell stack according to the first embodiment.

As shown in FIG. 2, in the fuel cell stack 15, a plurality of cells 50 is stacked, and an inlet-side manifold 51 and an outlet-side manifold 52 are provided so as to extend through a stack in which the cells 50 are stacked. The inlet-side pressure regulating valve 46 (and the shut-off valve 45 (not shown)) is provided at the inlet of the inlet-side manifold 51. The outlet-side pressure regulating valve 47 is provided at the outlet of the outlet-side manifold 52.

The inlet-side manifold 51 is a passage that supplies outside air containing oxidant gas to an oxidant electrode of each of the plurality of cells 50. The outlet-side manifold 52 is a passage that emits outside air containing oxidant gas and water from the oxidant electrode of each of the plurality of the cells 50 Water that appears at the exhaust side is produced in the cells 50 by the reaction between hydrogen gas that is fuel gas and oxygen that is oxidant gas.

Figure 3:
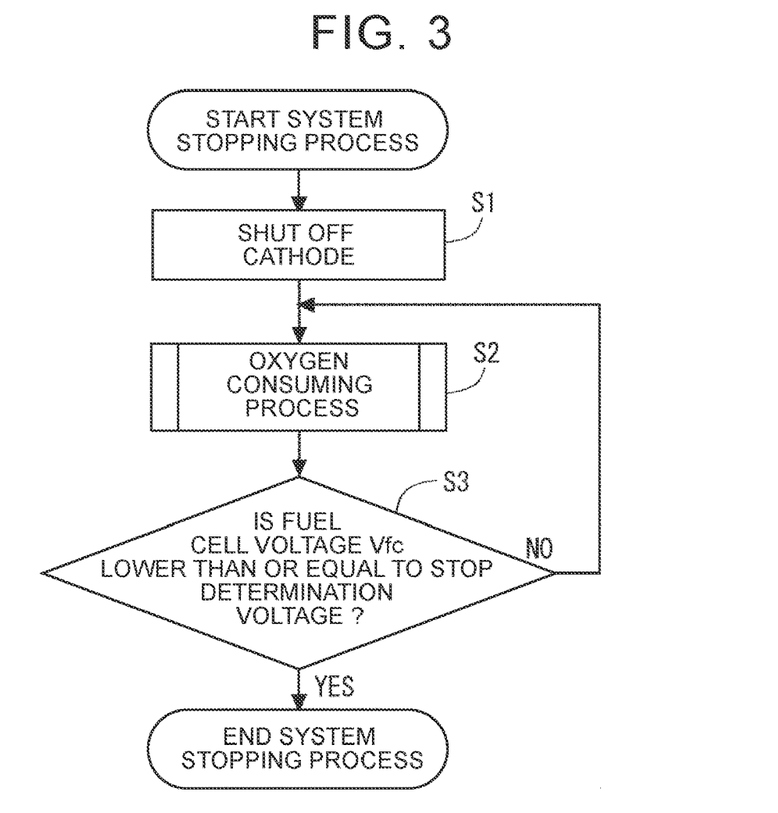
FIG. 3 is a flowchart that shows the operation of oxygen consuming process in the fuel cell system according to the first embodiment.

Next, the oxygen consuming process that is performed in the fuel cell system 1 according to the first embodiment will be described. FIG. 3 is a flowchart that shows the operation of the oxygen consuming process in the fuel cell system according to the first embodiment.

As shown in FIG. 3, the oxygen consuming process is performed as one of the processes of stopping the fuel cell system 1. In the oxygen consuming process, first, the shut-off valve 45 provided at a cathode (oxidant electrode) side is place in a shut-off state (closed state) (step S1). Subsequently, the oxygen consuming process for decreasing the concentration of oxygen in the fuel cell stack 15 is performed (step S2). In the oxygen consuming process, the load control unit 20 controls the fuel cell-side step-up converter 18 to cause the fuel cell stack 15 to generate electric power, thus decreasing the concentration of oxygen in the fuel cell stack 15. The oxygen consuming process is continued until the FC output voltage Vm becomes lower than or equal to a preset stop determination voltage (step S3). After that, when the FC output voltage Vm becomes lower than or equal to the stop determination voltage, the oxygen consuming process ends, and the fuel cell system 1 is placed in the stopped state (step S3).

In the fuel cell system 1 according to the first embodiment, a method of controlling the value of current that is output from the fuel cell stack 15 during the oxygen consuming process has one of characteristics. Therefore, first, a change in the concentration of oxygen during the oxygen consuming process will be described.

Figure 4:
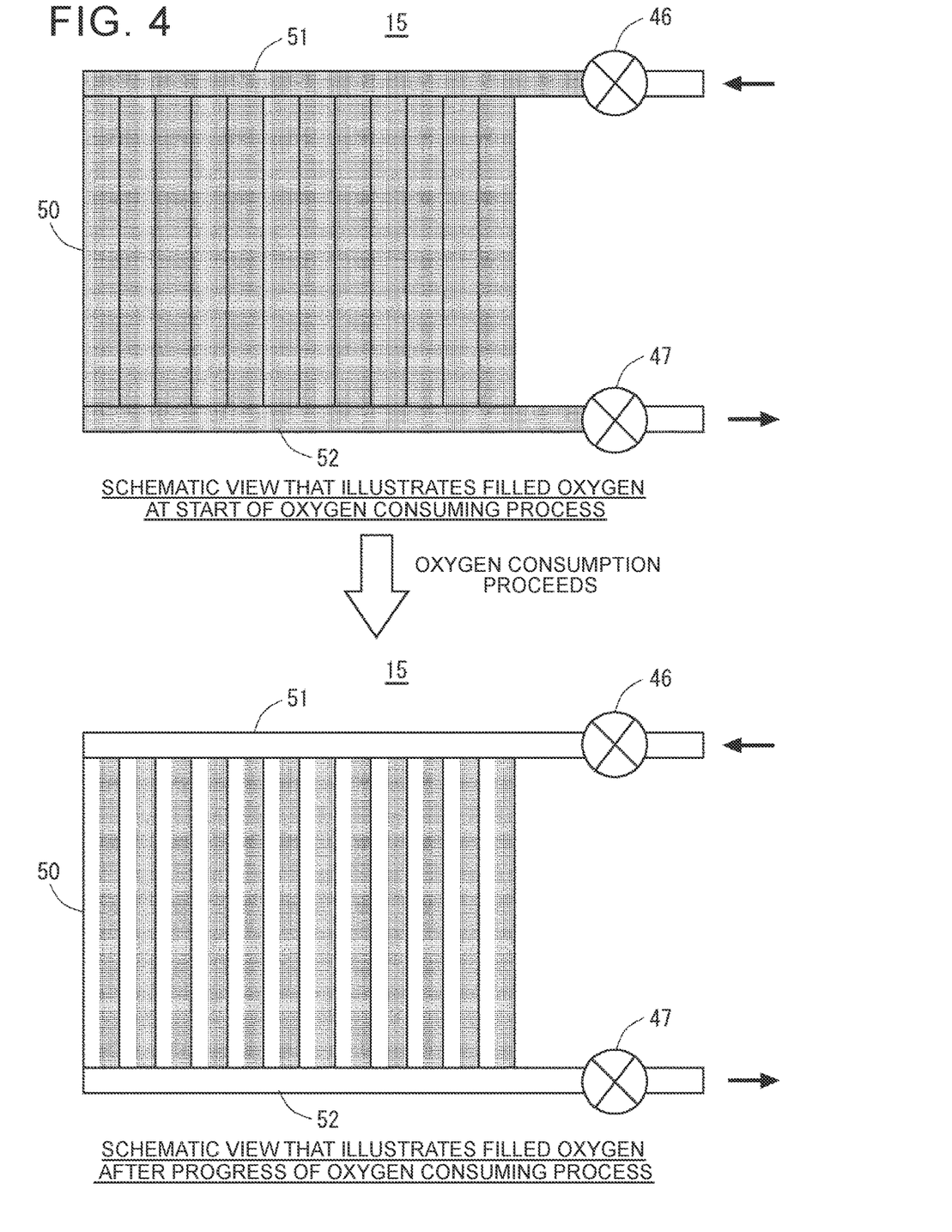
FIG. 4 is a view that illustrates a manner of filled oxygen before and after the oxygen consuming process in the fuel cell system according to the first embodiment.

FIG. 4 is a view that shows a manner of filled oxygen before and after the oxygen consuming process in the fuel cell system according to the first embodiment. In FIG. 4, regions where oxygen in concentration higher than or equal to a set value is present are shown by hatching. As shown in FIG. 4, in the fuel cell stack 15, oxygen is filled in the plurality of cells 50, the inlet-side manifold 51, and the outlet-side manifold 52 at the time when the oxygen consuming process is started. As the oxygen consuming process proceeds, oxygen is consumed by the oxidant electrodes of the cells 50, oxygen in the inlet-side manifold 51 and the outlet-side manifold 52 reduces, and the concentration of oxygen in the cells 50 also decreases.

Figure 5:
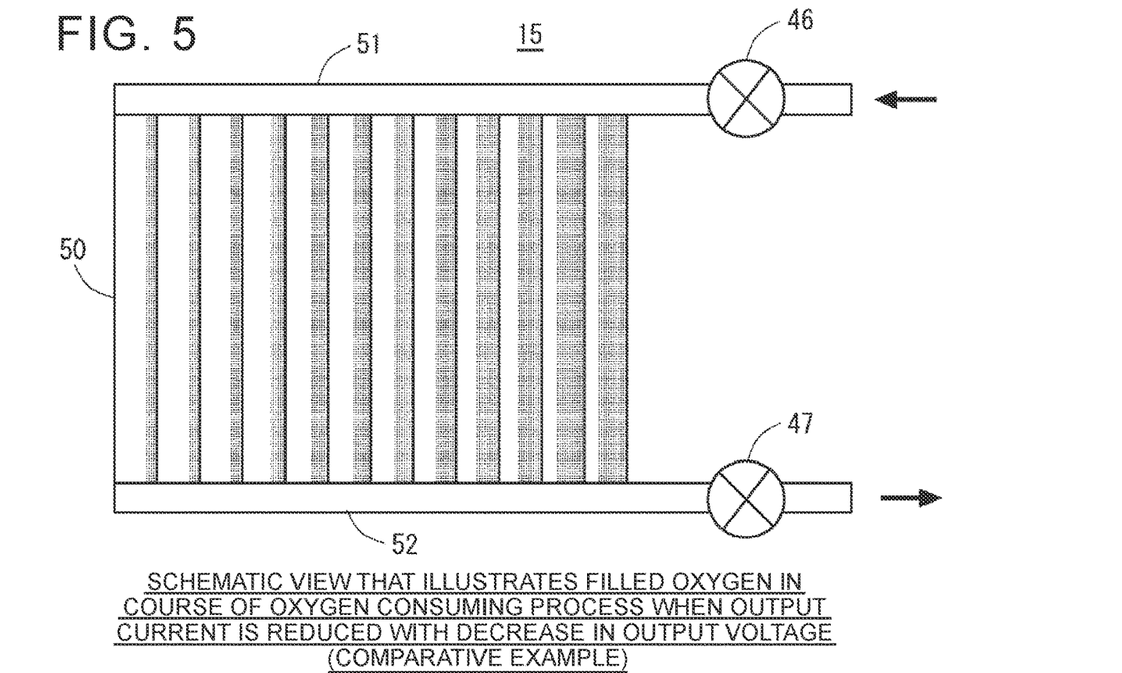
FIG. 5 is a view that illustrates a manner of oxygen consumption through the oxygen consuming process in the fuel cell system according to a comparative example.

In the oxygen consuming process, electric power is generated in a state where supply of oxidant gas to the fuel cell stack 15 is stopped in this way. Thus, the concentration of oxygen in the fuel cell stack 15 is decreased. However, depending on how the fuel cell stack 15 is caused to generate electric power, there can be a biased concentration of oxygen in the fuel cell stack 15. FIG. 5 is a view that illustrates a manner of oxygen consumption through the oxygen consuming process in the fuel cell system according to a comparative example. In the comparative example, a control method in which the fuel cell stack 15 is caused to output a large FC output current Im when the output voltage Vm for the oxygen consuming process is high and the magnitude of the FC output current Im is decreased with a decrease in the FC output voltage Vm is employed.

As shown in FIG. 5, in the fuel cell system according to the comparative example, in a state where the oxygen consuming process has proceeded, the concentration of oxygen in the cells 50 closer to the inlet and outlet of the fuel cell stack 15 for oxidant gas is high, and the concentration of oxygen in the cells 50 decreases away from the inlet and outlet for oxidant gas. In other words, in the fuel cell system according to the comparative example, in the course of the oxygen consuming process, there occurs a biased concentration in oxygen between the cells 50.

When there occurs a biased concentration in oxygen between the cells 50 in this way, a pumping phenomenon occurs in the cells 50 in which the concentration of oxygen is particularly low. The pumping phenomenon is a phenomenon that fuel gas (for example, hydrogen) taken into a fuel electrode appears again as gas at an oxidant electrode side because of no oxidant gas with which the fuel gas reacts. For this reason, the concentration of oxygen at the oxidant electrode side decreases as the pumping phenomenon occurs, while a phenomenon that the concentration of hydrogen increases appears. In the fuel cell system 1, the concentration of fuel gas to be emitted is limited by regulations, and an increase in the concentration of hydrogen at the oxidant electrode side becomes an obstacle to satisfy a restricting value.

Figure 6:
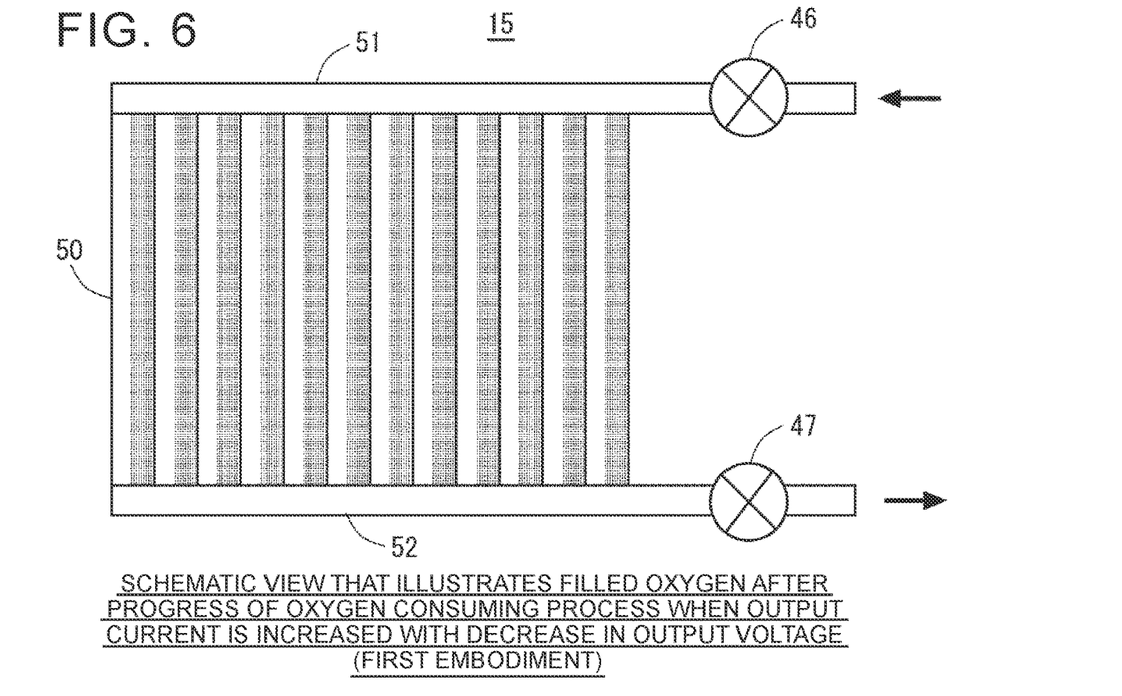
FIG. 6 is a view that illustrates a manner of oxygen consumption through the oxygen consuming process in the fuel cell system according to the first embodiment.

Therefore, in the fuel cell system 1 according to the first embodiment, when the oxygen consuming process is performed, the load control unit 20 and the fuel cell-side step-up converter 18 execute current control such that the FC output current Im during the oxygen consuming process in which the FC output voltage Vm is high is reduced and the FC output current Im is increased with a decrease in the FC output voltage Vm. A change in the concentration of oxygen in the fuel cell stack 15 when such control is executed in the fuel cell system 1 according to the first embodiment will be described. FIG. 6 is a view that illustrates a manner of oxygen consumption through the oxygen consuming process in the fuel cell system according to the first embodiment.

As shown in FIG. 6, the fuel cell system 1 according to the first embodiment executes control such that the FC output current Im is reduced when the FC output voltage Vm is high and then the FC output current Im is increased with a decrease in the FC output voltage Vm. Thus, the rate of diffusion of oxygen in the fuel cell stack 15 catches up with the rate of the oxygen consuming process. Thus, in the fuel cell system 1 according to the first embodiment, even when the oxygen consuming process proceeds, a biased concentration of oxygen between the cells 50 is reduced.

Figure 7:
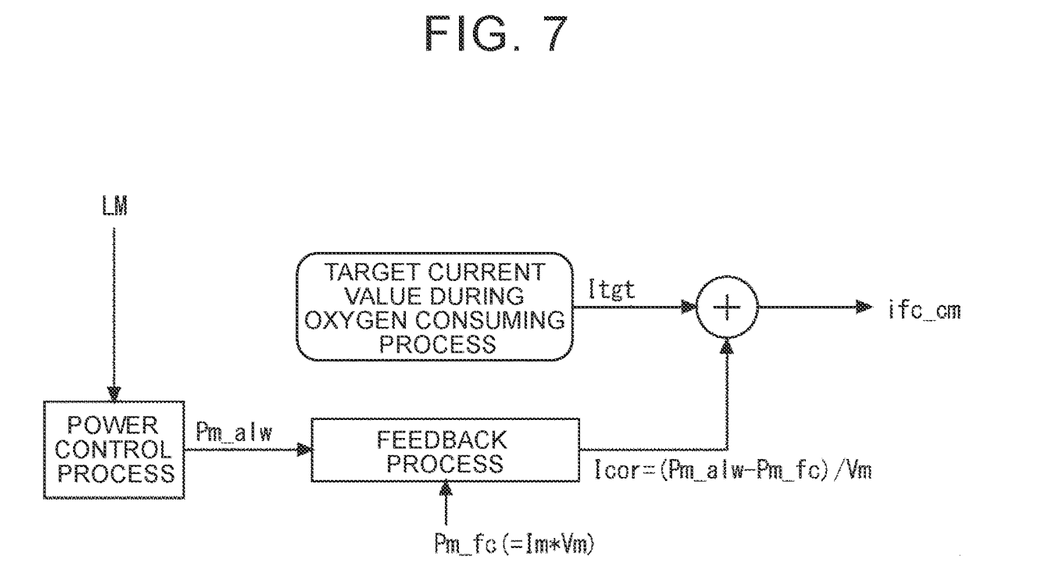
FIG. 7 is a flowchart that illustrates a method of discharge control in the fuel cell system according to the first embodiment.

In the fuel cell system 1 according to the first embodiment, the load control unit 20 executes control over the FC output current Im of the fuel cell stack 15 during the oxygen consuming process. The process of determining the FC output current Im, which is executed in the load control unit 20, will be described below. FIG. 7 is a flowchart that illustrates a method of discharge control in the fuel cell system according to the first embodiment.

The process shown in FIG. 7 is a process that is mainly executed by the power distribution control unit 21 of the load control unit 20. As shown in FIG. 7, when the power distribution control unit 21 receives battery monitoring information LM from the lithium ion battery 12, the power distribution control unit 21 extracts the allowable input power Pm_alw contained in the battery monitoring information LM. Then, the power distribution control unit 21 executes feedback process for calculating the value of the second term on the right-hand side of the mathematical expression (1) by using the extracted allowable input power Pm_alw and the FC output power Pm_fc that is output from the converter control unit 22. In the feedback process, the FC output voltage Vm is used; however, the FC output voltage Vm is contained in the value of the FC output power Pm_fc, and, in the feedback process, the FC output voltage Vm contained in the value of FC output power Pm_fc is used. The value that is calculated through the feedback process is referred to as sweeping correction value Icor below.

In the power distribution control unit 21, a target current Itgt in the oxygen consuming process is stored in, for example, a nonvolatile memory, or the like. The target current Itgt in the oxygen consuming process is the value of the first term on the right-hand side of the mathematical expression (1). The converter control unit 22 calculates the current in the oxygen concentration process (for example, sweeping current command value ifc_cm) by adding the sweeping correction value Icor to the target current Itgt in the oxygen consuming process.

From the above description, the fuel cell system 1 according to the first embodiment, in the oxygen consuming process that is performed over the fuel cell stack 15, executes current control such that the FC output current Im is reduced when the FC output voltage Vm is high and the FC output current Im is increased with a decrease in the FC output voltage Vm. Thus, a bias of oxygen remaining in the fuel cell stack 15 is reduced. The pumping phenomenon is suppressed by preventing a bias of oxygen remaining in the fuel cell stack 15 in this way, with the result that leakage of fuel gas to the oxidant electrode side is reduced.

In the fuel cell system 1 according to the first embodiment, the lithium ion battery 12 is charged with electric power generated in the oxygen consuming process. At this time, in the fuel cell system 1 according to the first embodiment, the electric power that the fuel cell stack 15 is caused to generate is limited to lower than or equal to the allowable input power of the lithium ion battery 12. The allowable input power of the lithium ion battery 12 is particularly lower in a situation in which the temperature of the lithium ion battery 12 is low. This is because, in a low-temperature environment, the internal resistance of the lithium ion battery 12 increases. In the lithium ion battery 12 in a temperature environment, the rate of movement of lithium ions decreases, so there is inconvenience that lithium metal irreversibly precipitates on a negative electrode surface unless a charging rate is decreased. Although the lithium ion battery 12 has such characteristics, in the fuel cell system 1 according to the first embodiment, a current that is charged into the lithium ion battery 12 at lower temperatures increases with a lapse of time from the start of the oxygen consuming process by restricting the FC output current Im at the start. For this reason, with the fuel cell system 1 according to the first embodiment, the service life of the lithium ion battery 12 can be extended.

With the fuel cell system 1 according to the first embodiment, all the cells 50 that make up the fuel cell stack 15 can be caused to efficiently generate electric power by minimizing a bias of oxygen remaining in the fuel cell stack 15 during the oxygen consuming process, so a time required for the oxygen consuming process can be shortened.

As described above, the disclosure made by the inventors is specifically described based on the embodiment; however, the disclosure is not limited to the above-described embodiment. Of course, the embodiment may be modified into various forms without departing from the purport of the disclosure.

What is claimed is:

1. A fuel cell system that executes oxygen consuming control for consuming oxygen remaining in a fuel cell when the fuel cell is shifted from a power generation state to a stopped state, the fuel cell system comprising:
   the fuel cell including a fuel electrode configured to be supplied with fuel gas and an oxidant electrode configured to be supplied with oxidant gas, the fuel cell being configured to generate electric power by causing the fuel gas and the oxidant gas to react with each other;
   a voltmeter configured to measure an output voltage of the fuel cell;
   an ammeter configured to measure an output current of the fuel cell;
   a restricting valve provided upstream and a restricting valve provided downstream of an oxidant electrode side of the fuel cell, the restricting valves being configured to be opened in the power generation state and be closed in the stopped state or under the oxygen consuming control; and
   a load control unit configured to control a current value of the output current that the fuel cell outputs, the load control unit being configured to, under the oxygen consuming control, control the output current of the fuel cell such that the output current reduces as the output voltage of the fuel cell increases.

2. The fuel cell system according to claim 1, further comprising:
   a secondary battery; and
   a load wire configured to transmit electric power, which is output by the fuel cell or the secondary battery, to a load, wherein the load control unit is configured to, under the oxygen consuming control, supply the secondary battery with electric power taken out from the fuel cell.

3. The fuel cell system according to claim 2, wherein:
   the load control unit is configured to
   acquire, from the secondary battery, information about an allowable electric power that indicates a chargeable electric power in the secondary battery,
   calculate an output electric power of the fuel cell from the output voltage acquired from the voltmeter and the output current acquired from the ammeter, and
   control the output current of the fuel cell based on an oxygen consuming current that is obtained by dividing a value, obtained by subtracting the output electric power from the allowable electric power, by the output voltage.

4. The fuel cell system according to claim 3, wherein the load control unit has a target current value in advance, the target current value is a target value of the output current to be output by the fuel cell under the oxygen consuming control, the load control unit is configured to control the output current of the fuel cell based on a current command value that is obtained by adding the oxygen consuming current to the target current value.

5. The fuel cell system according to claim 1, wherein, in the fuel cell, a plurality of cells is stacked to become a fuel cell stack and gas containing oxidant is supplied to the plurality of cells via a manifold extending through the fuel cell stack.

6. A method operating a fuel cell system that executes oxygen consuming control for consuming oxygen remaining in a fuel cell when the fuel cell is shifted from a power generation state to a stopped state, the method comprising the steps of:
   supplying fuel gas to a fuel electrode of the fuel cell, and oxidant gas to an oxidant electrode of the fuel cell;
   generating electric power by causing the fuel gas and the oxidant gas to react with each other;
   measuring an output voltage of the fuel cell;
   measuring an output current of the fuel cell;
   opening a restricting valve provided upstream and a restricting valve provided downstream of an oxidant electrode side of the fuel cell, in the power generation state and closing the restricting valves in the stopped state or under the oxygen consuming control; and
   controlling a current value of the output current that the fuel cell outputs, under the oxygen consuming control, such that the output current reduces as the output voltage of the fuel cell increases.

7. The method of claim 6, further comprising the steps of:
   transmitting electric power which is output by the fuel cell or a secondary battery to a load, and
   supplying, under oxygen consuming control, the secondary battery with electric power from the fuel cell.

8. The method of claim 7, further comprising the steps of:
   acquiring, from the secondary battery, information about an allowable electric power that indicates a chargeable electric power in the secondary battery,
   calculating an output electric power of the fuel cell from the output voltage acquired from the voltmeter and the output current acquired from the ammeter, and
   controlling the output current of the fuel cell based on an oxygen consuming current that is obtained by dividing a value, obtained by subtracting the output electric power from the allowable electric power, by the output voltage.

9. The method of claim 8, further comprising the step of:
   setting a target current value in advance, wherein the target current value is a target value of the output current to be output by the fuel cell under the oxygen consuming control,
   controlling the output current of the fuel cell based on a current command value that is obtained by adding the oxygen consuming current to the target current value.

* * * * *